United States Patent [19]

Coetzer et al.

[11] Patent Number: 5,019,466
[45] Date of Patent: * May 28, 1991

[54] ELECTROCHEMICAL CELL

[75] Inventors: Johan Coetzer; Anthony A. Meintjes, both of Pretoria; Keith T. Adendorff, Springs, all of South Africa

[73] Assignee: Lilliwyte Societe Anonyme, Luxembourg

[*] Notice: The portion of the term of this patent subsequent to Jan. 10, 2006 has been disclaimed.

[21] Appl. No.: 452,828

[22] Filed: Dec. 20, 1989

[51] Int. Cl.$^5$ .......................... H01M 4/36; C25C 3/02
[52] U.S. Cl. ...................................... 429/103; 429/50; 204/68; 204/2.4
[58] Field of Search .......................... 204/68; 429/103

[56] References Cited

U.S. PATENT DOCUMENTS 3,751,298  8/1973  Senderoff ............................. 136/6 F
4,797,333  1/1989  Coetzer et al. ........................ 204/68

OTHER PUBLICATIONS

Erbacher, J. K. et al., "A Low Temperature, Long-Life, Pelletized LiAl/CuCl$_2$ Single Cell for Thermal Battery Application", Proceedings of the 28th Power Sources Symposium, 12-18 Jun. 1978.
U.S. patent application Ser. No. 07/405,169 (apparently filed on Sep. 11,1989).
Boxall et al., "Electrochemical Studies on Ag, Fe, and Cu Species in AlCl$_3$-NaCl Melts", J. Electrochem. Soc.: Electrochemical Science and Technology, Feb. 1974, pp. 212 to 219.

Primary Examiner—John F. Niebling
Assistant Examiner—Caroline Koestner
Attorney, Agent, or Firm—Arnold, White & Durkee

[57] ABSTRACT

A method of making an electrochemical cell comprises loading into the cathode compartment of a cell housing comprising an anode compartment separated from a cathode compartment by a separator which is a solid conductor of ions of alkali metal M or is a micromolecular sieve which contains alkali metal M sorbed therein; an alkali metal aluminium halide molten salt electrolyte having the formula MAlHal$_4$ wherein M is the alkali metal of the anode and Hal is a halide; Cu as an active cathode substance; and an alkali metal halide MHal wherein M and Hal are respectively an alkali metal and a halide; thereby to make an electrochemical cell precursor. The precursor is charged at a temperature at which the molten salt electrolyte and alkali metal M are molten, thereby to halogenate the Cu, with alkali metal being produced and passing through the separator into the anode compartment, the proportions of alkali metal halide MHal, Cu and molten salt electrolyte loaded into the cathode compartment being selected so that when the cell is fully charged and all the available active cathode substance has been halogenated, the proportion of alkali metal ions and aluminium ions is such that the solubility of the active cathode substance in the molten electrolyte is at or near its minimum.

22 Claims, 5 Drawing Sheets

ELECTROCHEMICAL CELL

THIS INVENTION relates to an electrochemical cell. It relates also to a method of making an electrochemical cell.

According to a first aspect of the invention, there is provided a method of making an electrochemical cell of the type comprising an anode compartment containing at the operating temperature of the cell and when the cell is in its charged state, a molten alkali metal anode, and a cathode compartment containing, at said operating temperature and when the cell is in its discharged state, an alkali metal aluminium halide molten salt electrolyte which is also molten at the operating temperature of the cell, and having the formula $MAlHal_4$, wherein M is the alkali metal of the anode and Hal is a halide, the cathode compartment containing also a cathode which comprises an electronically conductive electrolyte-permeable matrix which has dispersed therein Cu as an active cathode substance, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, the method comprising loading into the cathode compartment of a cell housing comprising an anode compartment separated from a cathode compartment by a separator which is a solid conductor of ions of alkali metal M or is a micromolecular sieve which contains alkali metal M sorbed therein, an alkali metal aluminium halide molten salt electrolyte having the formula $MAlHal_4$ wherein M is the alkali metal of the anode and Hal is a halide;

Cu as an active cathode substance; and an alkali metal halide MHal wherein M and Hal are respectively an alkali metal and a halide, thereby to make an electrochemical cell precursor; and charging the precursor at a temperature at which the molten salt electrolyte and alkali metal M are molten, thereby to halogenate the Cu, with alkali metal being produced and passing through the separator into the anode compartment, the proportions of alkali metal halide MHal, Cu and molten salt electrolyte loaded into the cathode compartment being selected so that when the cell is fully charged and all the available active cathode substance has been halogenated, the proportion of alkali metal ions and aluminium ions is such that the solubility of the active cathode substance in the molten electrolyte is at or near its minimum.

The molar proportion or ratio of alkali metal ions and aluminium ions in the electrolyte is preferably not less than one, to obtain said minimum solubility.

While M and Hal of the alkali metal halide MHal will normally be the same as the M and Hal respectively of the electrolyte $MAlHal_4$, they can, however, instead be different.

The alkali metal, M, may be sodium, with the separator being beta-alumina. However, in other embodiments of the invention, the alkali metal may instead be potassium or lithium, with the separator then being selected to be compatible therewith. The halide may be chlorine, so that the alkali metal halide, MHal, is sodium chloride. The electrolyte may then be in the form of a sodium chloride-aluminium chloride mixture or in the form of the double salt, ie $NaAlCl_4$. However, the halide may instead be bromine or iodine, so that the alkali metal halide is then NaBr or NaI, with the electrolyte being $NaAlBr_4$ or $NaAlI_4$ respectively.

It is believed that when the chloride salts are used, the initial reaction on charging the cell is $$Cu + NaCl \rightarrow CuCl + Na \quad (1)$$

Further electrochemical oxidation should result in the following reaction that would occur at a higher voltage $$CuCl + NaCl \rightarrow CuCl_2 + Na \quad (2)$$

The overall reaction would therefore be $$Cu + 2NaCl \rightarrow 2Na + CuCl_2 \quad (3)$$

However, it is believed that reaction (2) may be prevented from occurring, at least partially, if an excess of Cu is present in the electrode which will result in reduction of $CuCl_2$ to CuCl according to the reaction $$CuCl_2 + Cu \rightarrow 2CuCl \quad (4)$$

Other halide ions may also be used, and in certain instances to the advantage of the cell reaction. For example, CuBr and $NaAlBr_4$ may be used. Although the Na/CuBr open circuit voltage is lower than the Na/CuCl open circuit voltage, it is believed that CuBr (melting point 492° C.) is less soluble in $NaAlHal_4$, and specifically $NaAlCl_4$, than CuCl (melting point 430° C.). In this case the method thus involves, on charging of the cell, the following reactions taking place in the cathode compartment:

$$Cu + NaBr \rightarrow CuBr + Na \quad (5)$$

$$CuBr + NaBr \rightarrow CuBr_2 + Na \quad (6)$$

$$Overall: Cu + 2NaBr \rightarrow 2Na + CuBr \quad (7)$$

with the Na migrating to the anode compartment via the separator.

The method may include initially loading also some aluminium into the cathode compartment, with no sodium being present in the anode compartment. On subjecting the cell precursor to an initial charging, the aluminium reacts with the alkali metal halide MHal to produce further molten salt electrolyte and to form alkali metal M which passes through the separator into the anode compartment. Sufficient aluminium is then provided so that the initial reaction with the aluminium on charging provides the initial starting up amount of sodium in the anode compartment, with normal charge and discharge reactions of the cell between its fully charged and discharged states, in accordance with reaction (1) thereafter taking place.

The copper may initially be in the form of copper powder or filings.

When a $NaAlBr_4$ electrolyte is used, it may be doped with $NaAlCl_4$ to facilitate initial handling of the electrolyte. Since the charging plateau of Cu/copper bromide//Na is lower than that of Cu/copper chloride//Na, copper bromide will form preferentially in the cathode compartment. It is believed that in such doped systems the solid solution which forms between copper bromide and copper chloride will result in the lowering of the solubility of the copper salt in the electrolyte, as well as lowering of the open cell voltage.

The method may also include adding a fluoro containing salt to the electrolyte, ie doping the electrolyte with a fluoro containing salt, to combat progressively increasing internal resistance of the cell associated with cyclic charging and discharging thereof and to act as a copper ion scavenger. The fluoro containing salt may be NaF, and the proportion of NaF in the liquid electrolyte may be between 2% and 25% on a molar basis, preferably between 10% and 20% on a molar basis, and typically 10–5%.

When the copper is in metallic form, it may be in the form of copper powder or filings, with the aluminium, when present, being in electrical contact with the copper, eg being present in the form of a surface coating, alloy, or the like.

The copper may instead initially be loaded into the cathode compartment in the form of an electronically conducting backbone, with carbon dispersed therein. Carbon has the advantage of being lighter and cheaper than copper, and results in a less dense matrix.

The copper and the alkali metal halide may be mixed together in particulate form, eg granules, to form a mixture, the mixture sintered to form an electrolyte-permeable matrix, and the matrix impregnated with the molten salt electrolyte prior to loading thereof into the cathode compartment. The matrix may hence contain sufficient copper to fulfill the function as active cathode substance as well as to act as current collector.

The method may include adding at least one transition metal to the cathode compartment in a minor proportion, to prevent or retard grain growth. The transition metal may then be in the form of a compound with the copper. The transition metal may be mixed or alloyed with the copper. The transition metal may constitute less than 30%, typically less than 10% and preferably less than 5%, of the alloy or mixture.

When the matrix has been impregnated with, for example, said $NaAlCl_4$ electrolyte and the NaCl incorporated therein, it is a cathode precursor which is coupled via the separator with the anode compartment and which becomes a cathode after it has been subjected to at least one charge cycle.

More specifically, forming the matrix may comprise sintering particles such as powders or fibres of the copper, optionally with carbon particles dispersed therein, in a reducing atmosphere.

Incorporating the NaCl into the matrix may be effected simultaneously with the formation of the matrix, the NaCl in finely divided particulate form being dispersed into the particulate material, eg granules, from which the matrix is formed, prior to formation of the matrix. Such granules can have an extremely high density. Hence, the incorporation into the granules of the NaCl or an additive such as aluminium results in additional porosity when the cell precursor is subjected to a first charging cycle. Granulation also promotes homogeneity of chemical species within the cathode compartment.

Instead, the NaCl may be incorporated into the matrix by melting the electrolyte and suspending particulate NaCl in finely divided form in the molten electrolyte, prior to impregnating the electrolyte into the matrix.

It is hence apparent from the foregoing that the NaCl may be incorporated into the matrix in any one of a number of suitable different ways.

In another more specific version of the invention, the NaCl and the copper may be combined by forming a mixture in particulate form of the copper and NaCl. Still more particularly, the formation of the mixture may comprise mixing together NaCl and Cu powders.

Impregnating the molten salt electrolyte into the matrix may be by means of vacuum impregnation with the electrolyte in the molten state.

The powder mixture may then be impregnated, eg saturated, with the electrolyte, which may be effected simply by wetting the mixture with the electrolyte in molten liquid form, for example after the powder mixture has been packed, for example by tamping, into the cathode compartment. This will, in effect, provide a cathode precursor in a discharged state, which can then be activated by charging.

In the charging reaction of this precursor, the metal component of the mixture is halogenated, sodium being produced during the halogenation, which sodium moves through the separator in ionic form, into the anode compartment where it exists in the charged or partially charged cell as molten sodium metal, electrons passing during the charging along the external circuit from the cathode compartment to the anode compartment.

Although the powder mixture may be charged in powder form after saturation with liquid electrolyte, the method may include as mentioned hereinbefore the additional step of sintering the powder mix to form a macroporous electrolyte permeable matrix prior to saturation with electrolyte, and activation by taking it through one or more charge cycles as a cathode to halogenate it.

The invention also extends to an electrochemical cell, when made according to a method as hereinbefore described.

The upper working or operating temperature of the cell will be such that the solubility of the active cathode substance in the molten electrolyte is low. Thus, the upper operating temperature may be below the halogenated copper/sodium chloride eutectic temperature in the presence of the $MAlHal_4$ electrolyte and excess copper and excess sodium chloride.

According to a second aspect of the invention, there is provided a precursor for a high temperature electrochemical cell which comprises a cell housing having an anode compartment and a cathode compartment separating from each other by a separator which comprises a solid conductor of ions of an alkali metal M or a micromolecular sieve which contains alkali metal M sorbed therein, the cathode compartment containing:

an alkali metal aluminium halide molten salt electrolyte having the formula $MAlHal_4$ wherein M is the alkali metal of the separator and Hal is a halide;

a cathode which comprises copper as an active cathode substance; and an alkali metal halide M wherein M and Hal are respectively an alkali metal and a halide, with the precursor being chargeable at a temperature at which the molten salt electrolyte and alkali metal M are molten to cause the active cathode substance to be halogenated, with alkali metal M being produced and passing through the separator into the anode compartment, the proportions of alkali metal halide MHal, copper and molten salt electrolyte being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

As mentioned hereinbefore, the active cathode substance as well as the alkali metal halide may be in particulate form, eg granules, with the alkali metal halide being mixed with the active cathode substance, and the mixture being impregnated with the molten salt electrolyte. The copper may be particulate and form part of said mixture, or form part of the granules. As also mentioned hereinbefore, the M and Hal of the alkali metal halide MHal will usually be the same as the M and Hal respectively of the electrolyte.

In another embodiment of the invention, the cathode may comprise an electronically conductive electrolyte-permeable matrix in which the active cathode substance and alkali metal halide are dispersed, the matrix being impregnated with the molten salt electrolyte.

It will be appreciated that minor quantities of impurities may be tolerated in the electrolyte, ie substances which will ionize in the molten electrolyte to provide ions which affect the electrochemical action of the electrolyte, but the quantity of such impurities should be insufficient to alter the essential character of the electrolyte as an $MAlHal_4$ system as defined.

When the separator is a micromolecular sieve, it may be a tectosilicate, eg a felspar, felspathoid or zeolite. When it is a zeolite, the zeolite may be a synthetic zeolite such as zeolite 3A, 4A, 13X, or the like. Preferably, however, the separator is a solid conductor of sodium ions such as beta-alumina or nasicon. For example, a beta-alumina tube can be used. The interior of the tube may be used as the anode compartment, with the tube being located in a cell housing which defines a cathode compartment outside the tube, in the interior of the housing, and with an anode compartment current collector being in intimate electrical contact with substantially the entire separator. The tube will be sealed and may be evacuated prior to charging to resist undesirable pressure build-up therein as sodium moves into the anode compartment during charging, through the tube wall. In this specification, beta-alumina is used broadly to include all phases of sodium-ion conducting beta-alumina, such as beta"-alumina.

To spread the sodium over the inside of the tube wall and to effect said intimate contact of the anode compartment current collector with the separator, suitable wicking material, electrically connected to the current collector and containing finely divided electrically conductive particles, may be spread over the wall surface. The material may, for example, be iron mesh, optionally tinned. This mesh hence acts as a part of an anode current collector, and may be attached to an evacuation pipe of the same metal, used to evacuate the tube interior prior to charging and projecting out of the cell to form the remainder of the anode current collector.

The main current collector of the cathode of the cell of the present invention will usually be the copper current collecting backbone of the matrix together with the housing. The housing may also be of copper. To improve the initial activation or charging characteristics of the cell, the cathode current collector may include a metal mesh or gauze connected, for example by welding, to the housing.

For close packing in batteries, the cell may have an elongate rectangular housing along the interior of which the tube extends in a more or less central position. To facilitate wicking in the anode compartment, the cell may be used horizontally, but this can lead to voids in the cathode compartment formed upon charging as the sodium moves into the anode compartment. For this reason, the cell may incorporate an electrolyte reservoir, more or less separate from but in communication with the cathode compartment, from which the electrolytes can pass, for example by draining under gravity, into the cathode compartment to keep it flooded with liquid electrolytes at all times. Naturally, for close packing, cells of similar construction but having an hexagonal cross-section can be employed instead.

The electrolyte may include a minor proportion of sodium fluoride as dopant. This combats potential progressive internal resistance rise on cell cycling and the invention accordingly contemplates incorporating a small proportion of sodium fluoride in the powder mix from which the cathode is formed. This sodium fluoride dissolves in the liquid electrolyte, in use. The electrolyte should be selected so that, at all states of charge, the solubility therein of the copper salt is at a minimum. This is achieved when the electrolyte comprises a mixture of sodium halide and aluminium halide in a 1:1 mole ratio, with the molten salt being in the presence of at least some solid sodium halide at all stages of charge. The only alkali metal present should be those which do not adversely affect the beta-alumina separator, and, although pure sodium aluminium halide can be used, said minor proportion of up to 10% on a molar basis or more of the electrolyte may be made up of sodium fluoride. This sodium fluoride could replace the equivalent proportion of sodium halide, so that said 1:1 mole ratio is retained. The proportion of sodium fluoride will, however, be sufficiently low for the electrolyte to retain its essential character as a sodium aluminium halide electrolyte. There must thus be enough sodium halide, as mentioned above, for some solid sodium halide to remain in the cathode compartment when the cell is fully charged, ie to maintain minimum solubility.

The liquid electrolyte and/or active cathode substance may contain a minor proportion of a suitable chalcogen dispersed therein for resisting a progressive drop in the capacity of the cathode with repeated charge/discharge cycling of the cell.

The chalcogen may comprise one or more species, such as selenium or sulphur, or compounds containing sulphur such as a transition metal sulphide. The chalcogen is preferably in extremely finely divided form, and it or reaction products between it and components of the liquid electrolyte may even be dissolved in the electrolyte.

The invention will now be described, by way of example, with reference to the accompanying drawings.

Figure 1:
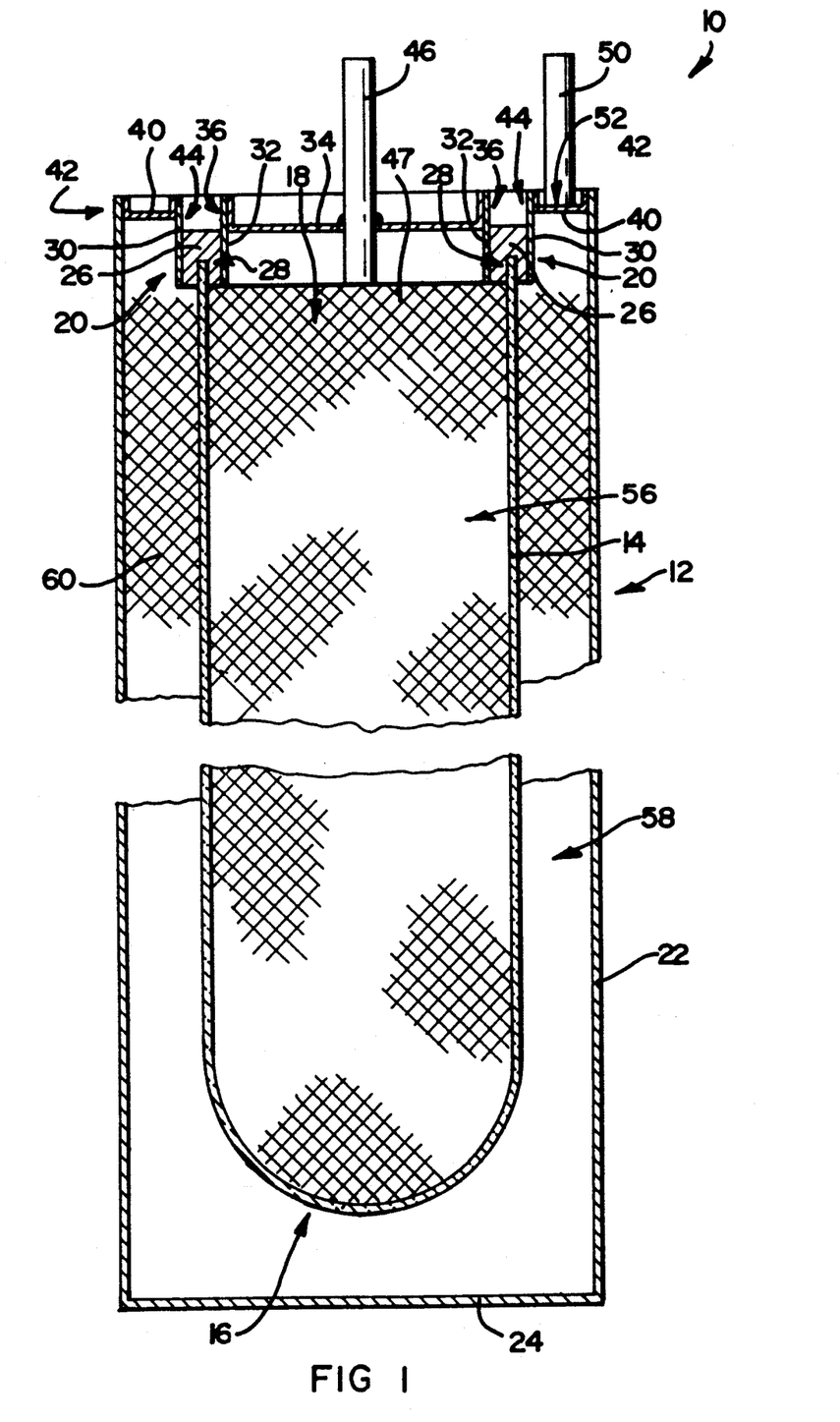
FIG. 1 shows a schematic sectional side elevation of an electrochemical cell, in accordance with the present invention.

Referring to FIG. 1, reference numeral 10 generally indicates an electrochemical cell in accordance with the invention.

The cell 10 includes an outer cylindrical casing 12 having a side wall 22 connected to a circular floor 24; a beta-alumina tube 14 located concentrically within the casing 12, the tube 14 being closed at its one end 16 and open at its other end 18; and a collar assembly 20 around the end 18 of the tube 14. The collar assembly 20 comprises a circular insulating ring 26 of alpha-alumina, with the end 18 of the tube 14 mounted to the ring 26 by being sealingly located in an annular groove 28 in the ring. Two concentric truncated cylinders of nickel, designated 30, 32, are bonded fluid tightly to the outer and inner curved surfaces respectively of the ring 26. An annular closure disc 34 closes off the open end 18 of the tube 14, the disc 34 being secured to the truncated cylinder or ring 32 at 36. An annular disc 40 also closes off the end of the casing 12 remote from the floor 24, the disc 40 being secured, eg welded, to the casing at 42 and to the ring 30 at 44. A steel rod current collector 46 projects into the tube 14, and a steel rod current collector 50 protrudes from the disc 40 at 52. The current collector 46 is electrically connected to a porous wicking layer 47 lining the inside of the separator tube 14, ie in intimate contact with the tube 14, with finely divided electrically conductive particles, eg Ni and/or Fe particles incorporated in the layer.

An anode compartment 56 is hence provided inside the tube 14, with a cathode compartment 58 being provided around the outside of the tube 14, within the casing 12, the beta-alumina tube 14 hence constituting a separator between the anode and cathode compartments.

Into the cathode compartment 58 there is placed an electrolyte permeable matrix 60 of Cu, with sodium chloride powder incorporated therein in dispersed form. Sufficient molten $NaAlCl_4$ electrolyte is then added to the cathode compartment so that the matrix is impregnated with the electrolyte and the electrolyte wets the separator or tube 14. The beta-alumina tube 14 hence forms a continuous barrier between the electrolyte containing cathode compartment 58 and the anode compartment 56, within the housing 12. Initially, the layer 47 ensures the required electrical contact between the collector 46 and the separator 16. However, on the first sodium passing through the separator it 'wicks' along the layer 47 thereby providing further electrical contact between the anode compartment and the separator.

On charging the cell 10, the following reactions take place in the cathode compartment:

$NaCl + Cu \rightarrow Na + CuCl$ (1)

$CuCl + NaCl \rightarrow Na + CuCl_2$ (2)

Overall: $2NaCl + Cu \rightarrow 2Na + CuCl_2$ (3)

The Na generated by the reactions passes through the beta-alumina into the anode compartment. A small amount of starting Na can be provided in the anode compartment, in molten form, to connect the current collector 46 to the separator 14.

A series of tests were conducted with cells in accordance with the invention and being similar to that of FIG. 1:

EXAMPLE 1

Figure 2:
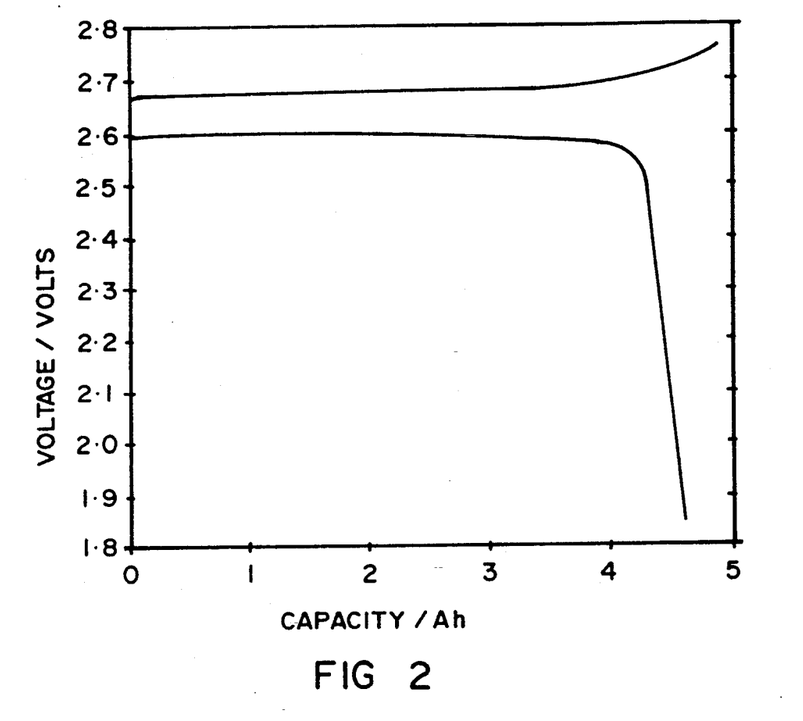
FIGS. 2 to 9 show plots of results obtained with test cells in accordance with the invention.
Figure 3:
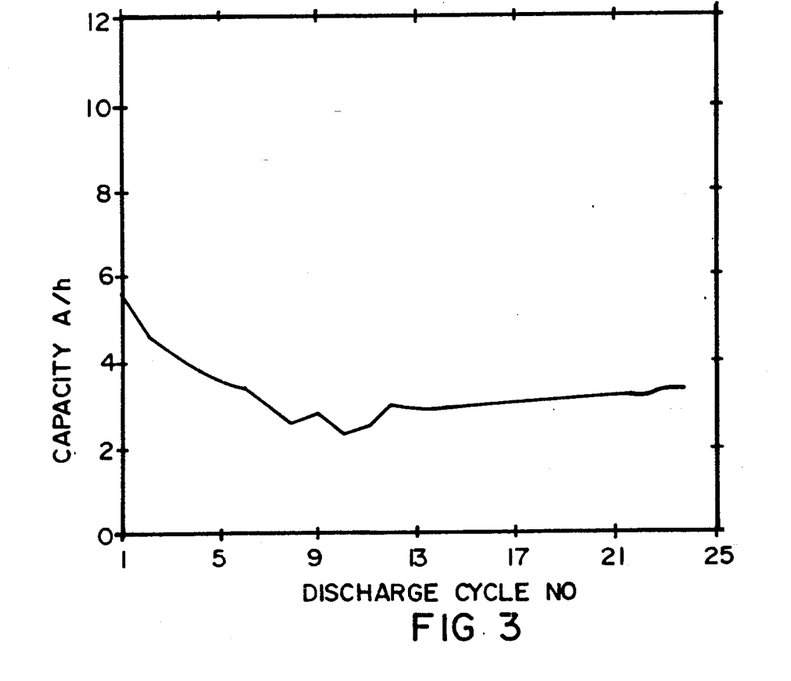

A copper cathode comprising 60 g Cu (Merck <63 um) admixed intimately with 40 g NaCl (<53 um) was sintered around a Cu metal strip current collector in hydrogen gas to form an electrode. The electrode was then loaded into a beta alumina tube, impregnated with the electrolyte sodium aluminium chloride and finally a small amount of sodium added to the negative electrode. The assembled cell was warmed to 220° C. and cycled at ½A charge (5 mA cm$^{-2}$) and 1A discharge (10mA cm$^{-2}$). FIG. 2 shows the charge/discharge curve of cycle 2 of this cell, demonstrating the reversibility of the Na/Cu-chloride couple in a basic $NaAlCl_4$ melt. The cell was capable of maintaining capacity, as shown in FIG. 3.

EXAMPLE 2

Figure 4:
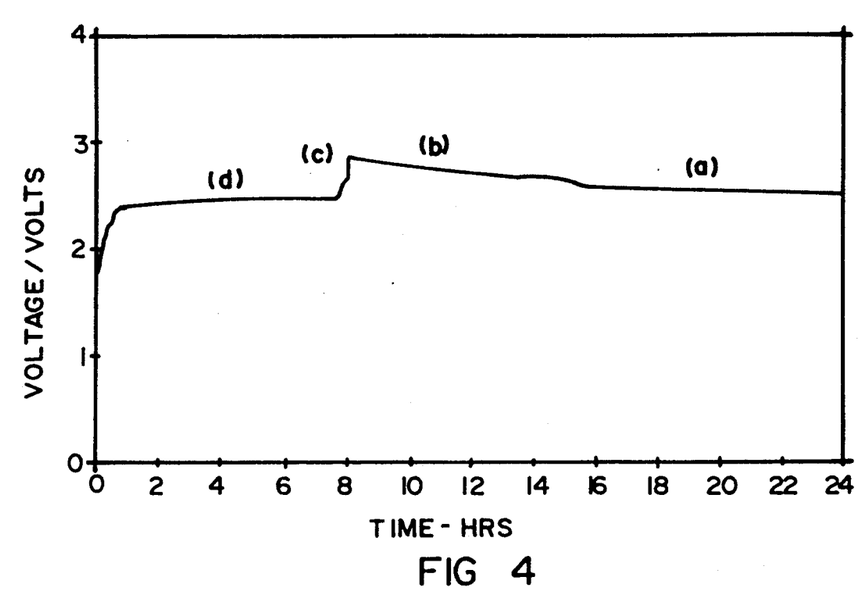
Figure 5:
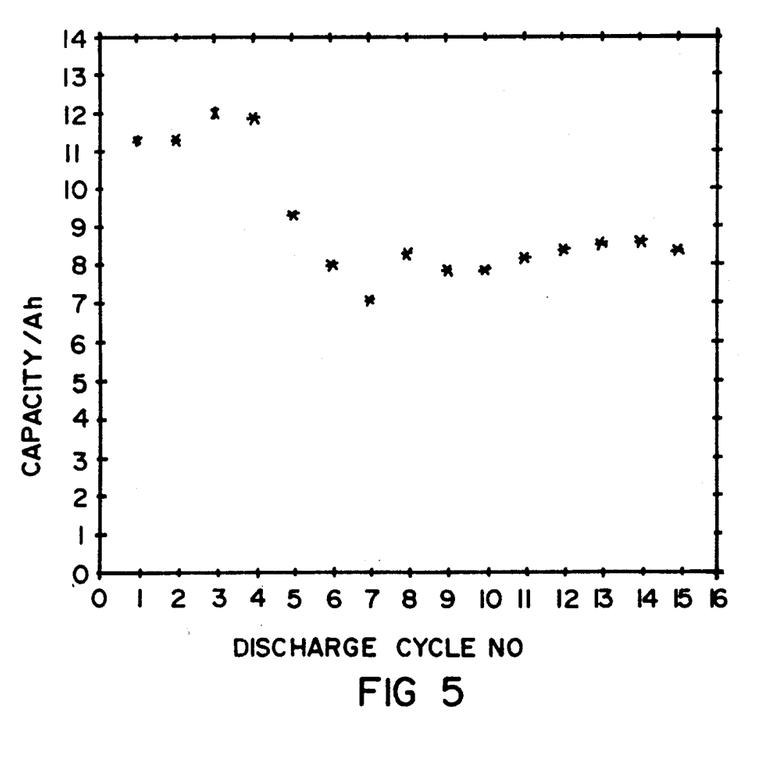

A copper cathode comprising 108 g Cu (15% bronze (BDH) + 85% Cu (Merck) intimately admixed with 83 g NaBr (<53 um) was sintered around a Cu metal strip current collector in hydrogen gas to form an electrode. The electrode was then loaded into a beta alumina tube, impregnated with the electrolyte sodium aluminium chloride and finally a small amount of sodium added to the negative electrode. The assembled cell was warmed to 250° C. and cycled at ½A charge (2.5 mA cm$^{-2}$) and 1A discharge (5 mA cm$^{-2}$). FIG. 4 shows the charge/discharge curves of cycle 15 of this cell, demonstrating the reversibility of the Na/Cu-bromide couple in a basic $NaAlCl_4$ melt. The two stages of the charging reactions are evident in FIG. 4, being identified as zones (a) and (b) respectively. On discharge only a fraction of the electrochemical reaction is accounted for by the reduction of $CuBr_2$ (zone (c)); the major portion is as a result of the reduction of CuBr to Cu and NaBr (zone (d)). FIG. 5 shows the capacity retention with cycling for 16 cycles.

EXAMPLE 3

Figure 6:
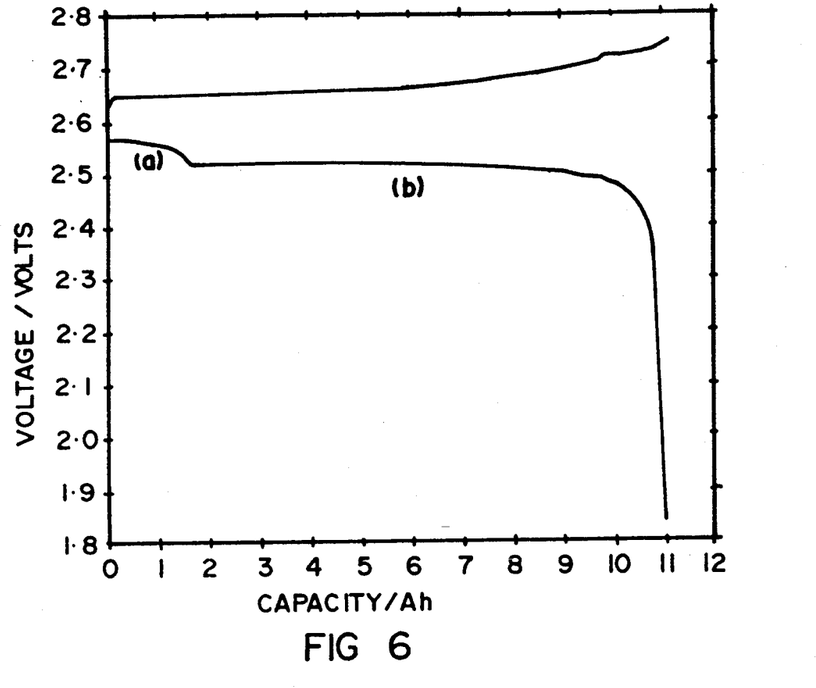
Figure 7:
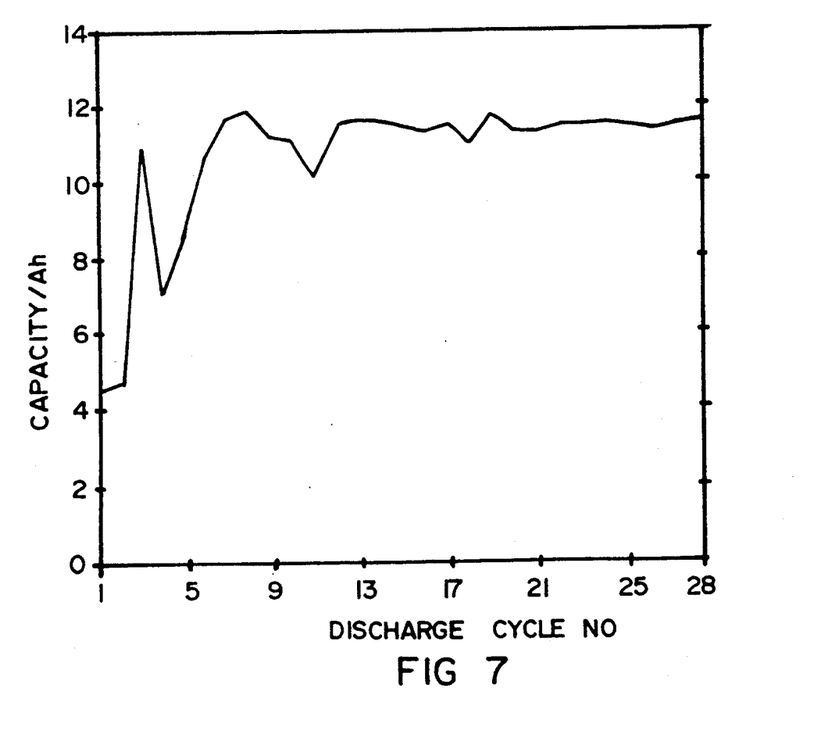

A mixed Cu plus Ni cathode (ie a Ni cell having a Cu backbone) comprising 30 g Ni (Inco 255) intimately admixed with, 30 g Cu (<63 um) and 40 g NaCl (<53 um) wax sintered in hydrogen gas around a Cu metal strip current collector, to form an electrode. The cell assembly was identical to EXAMPLE 1. The cell was operated at 250° C. and charged at 5 mA cm$^{-2}$ and discharged at 10 mA cm$^{-2}$. FIG. 6 illustrates the charge/discharge curves of cycle 10 of this cell, in which zone (a) represent the reduction of copper chloride and zone (b) the reduction of nickel chloride, during discharge. The charge curve shows that both reactions are reversible. FIG. 7 shows the capacity retention for 30 cycles.

EXAMPLE 4

Figure 8:
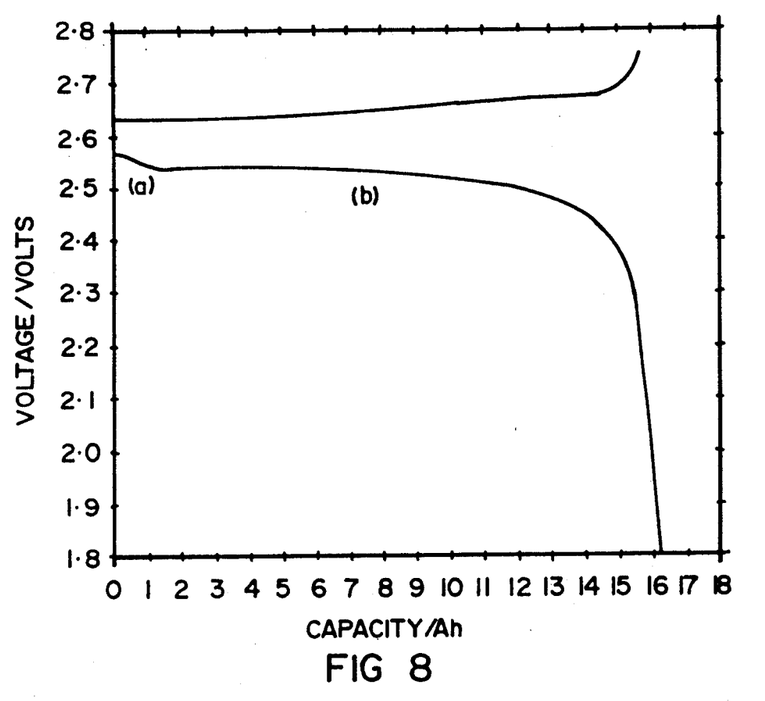
Figure 9:
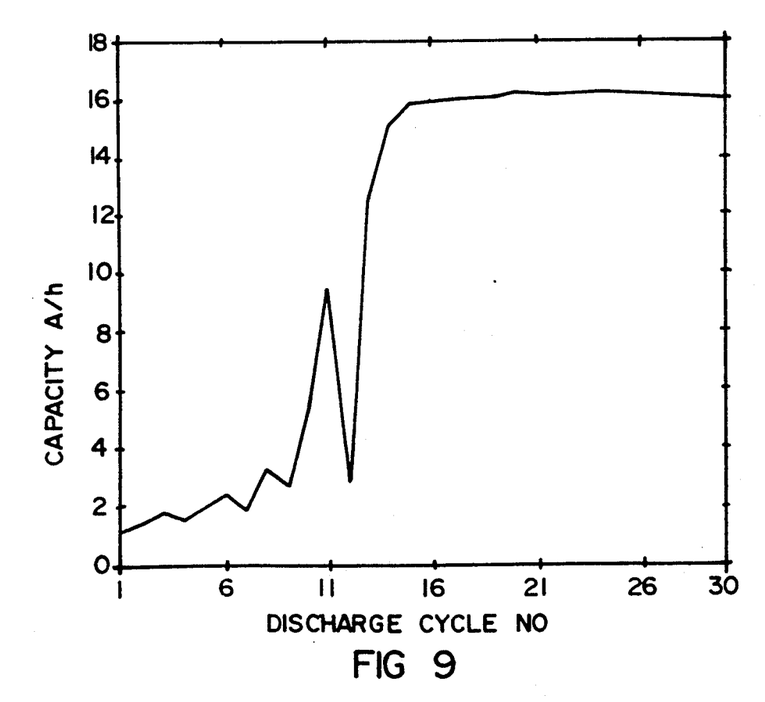

As for EXAMPLE 3 except that a Ni current collector was used. FIG. 8 is the charge/discharge curve for cycle no. 20 of this cell, in which zone (a) represent the reduction of copper chloride and zone (b) the reduction of nickel chloride during discharge. The charge curve shows that both reactions are reversible. FIG. 9 shows an improved capacity retention with cycling. The cell retained 90% of its theoretical capacity once it had been run in.

We claim:

1. A method of making an electrochemical cell of the type comprising an anode compartment containing at the operating temperature of the cell and when the cell is in its charged state, a molten alkali metal anode, and a cathode compartment containing, at said operating temperature and when the cell is in its discharged state, an alkali metal aluminium halide molten salt electrolyte which is also molten at the operating temperature of the cell, and having the formula $MAlHal_4$, wherein M is the alkali metal of the anode and Hal is a halide, the cathode compartment containing also a cathode which comprises an electronically conductive electrolyte-permeable matrix which has dispersed therein Cu as an active cathode substance, the matrix being impregnated with said electrolyte, and, separating the anode compartment from the cathode compartment, a separator which comprises a solid conductor of the ions of the alkali metal of the anode or a micromolecular sieve which contains said alkali metal sorbed therein, the method comprising loading into the cathode compartment of a cell housing comprising an anode compartment separated from a cathode compartment by a separator which is a solid conductor of ions of alkali metal M or is a micromolecular sieve which contains alkali metal M sorbed therein, an alkali metal aluminium halide molten salt electrolyte having the formula $MAlHal_4$ wherein M is the alkali metal of the anode and Hal is a halide;

Cu as an active cathode substance; and an alkali metal halide MHal wherein M and Hal are respectively an alkali metal and a halide; thereby to make an electrochemical cell precursor; and charging the precursor at a temperature at which the molten salt electrolyte and alkali metal M are molten, thereby to halogenate the Cu, with alkali metal being produced and passing through the separator into the anode compartment, the proportions of alkali metal halide MHal, Cu and molten salt electrolyte loaded into the cathode compartment being selected so that when the cell is fully charged and all the available active cathode substance has been halogenated, the proportion of alkali metal ions and aluminium ions is such that the solubility of the active cathode substance in the molten electrolyte is at or near its minimum.

2. A method according to claim 1, wherein the alkali metal, M, is sodium; the separator is beta-alumina; the halide is chlorine, so that the alkali metal halide, MHal, is sodium chloride; and the electrolyte is in the form of a sodium chloride-aluminium chloride mixture or in the form of the double salt $NaAlCl_4$.

3. A method according to claim 2, which includes initially loading also some aluminium into the cathode compartment, with no sodium being present in the anode compartment, so that on subjecting the cell precursor to an initial charging, the aluminium reacts with the alkali metal halide MHal to produce further molten salt electrolyte and to form alkali metal M which passes through the separator into the anode compartment with sufficient aluminium being provided so that the initial reaction with the aluminium on charging provides the initial starting up amount of sodium in the anode compartment, and with normal charge and discharge reactions of the cell between its fully charged and discharged states, in accordance with reaction (3) thereafter taking place.

4. A method according to claim 2, wherein the copper loaded into the cathode compartment is in particulate form.

5. A method according to claim 2, which includes doping the electrolyte in the cathode compartment with sodium bromide to act as a copper ion scavenger or getter so that copper bromide, which is insoluble in the electrolyte, will form in preference to copper chloride.

6. A method according to claim 2, which includes adding a fluoro containing salt to the electrolyte to combat progressively increasing internal resistance of the cell associated with cyclic charging and discharging thereof and to act as copper getter.

7. A method according to claim 6, wherein the fluoro containing salt is NaF, and the proportion of NaF in the liquid electrolyte is between 2% and 25% on a molar basis.

8. A method according to claim 2, wherein the copper is in particulate metallic form, with the aluminium, when present, being in electrical contact with the copper.

9. A method according to claim 2, wherein the copper initially loaded into the cathode compartment is in the form of an electronically conducting backbone, with carbon dispersed therein.

10. A method according to claim 2, wherein the copper and the alkali metal halide are mixed together in particulate form to form a mixture, the mixture sintered to form an electrolyte-permeable matrix, and the matrix impregnated with the molten salt electrolyte prior to loading thereof into the cathode compartment, with the matrix containing sufficient copper to fulfill the function as active cathode substance as well as to act as current collector.

11. A method according to claim 2, which includes adding at least one transition metal to the cathode compartment in a minor proportion, to prevent or retard grain growth.

12. A method according to claim 11, wherein the transition metal is in the form of a compound with the copper.

13. A method according to claim 11, wherein the transition metal is mixed with the copper.

14. A method according to claim 13, wherein the transition metal constitutes less than 30% of the mixture.

15. An electrochemical cell, when made according to a method as claimed in claim 1.

16. A precursor for a high temperature electrochemical cell which comprises a cell housing having an anode compartment and a cathode compartment separating from each other by a separator which comprises a solid conductor of ions of an alkali metal M or a micromolecular sieve which contains alkali metal M sorbed therein, the cathode compartment containing:

an alkali metal aluminium halide molten salt electrolyte having the formula $MAlHal_4$ wherein M is the alkali metal of the separator and Hal is a halide;

a cathode which comprises copper as an active cathode substance; and an alkali metal halide M wherein M and Hal are respectively an alkali metal and a halide, with the precursor being chargeable at a temperature at which the molten salt electrolyte and alkali metal M are molten to cause the active cathode substance to be halogenated, with alkali metal M being produced and passing through the separator into the anode compartment, the proportions of alkali metal halide MHal, copper and molten salt electrolyte being selected so that when the cell is fully charged and all the available active cathode substance has been halogenated, the proportion of alkali metal ions and aluminium ions in the electrolyte is such that the solubility of the active cathode substance in the molten electrolyte is at or near its minimum.

17. A precursor according to claim 16, wherein the active cathode substance as well as the alkali metal halide is in particulate form with the alkali metal halide being mixed with the active cathode substance, and the mixture being impregnated with the molten salt electrolyte and with the copper also being particulate and forming part of the mixture.

18. A precursor according to claim 16, wherein the cathode comprises an electronically conductive electrolyte-permeable matrix in which the active cathode substance and alkali metal halide are dispersed, the matrix being impregnated with the molten salt electrolyte.

19. A precursor according to claim 16, wherein the separator is a beta-alumina tube, with the interior of the tube being used as the anode compartment, and with the tube being located in a cell housing which defines a cathode compartment outside the tube, in the interior of the housing, and with an anode compartment current collector being in intimate electrical contact with substantially the entire separator.

20. A precursor according to claim 19, wherein, to spread the sodium over the inside of the tube wall and to effect said intimate contact of the anode compartment current collector with the separator, suitable wicking material, electrically connected to the current collector and containing finely divided electrically conductive particles, is spread over the tube wall surface.

21. A precursor according to claim 16, wherein the electrolyte includes a minor proportion of up to 10% on a molar basis of sodium fluoride as dopant.

22. A precursor according to claim 16, wherein the liquid electrolyte and/or active cathode substance contains a minor proportion of a suitable chalcogen dispersed therein for resisting a progressive drop in the capacity of the cathode with repeated charge/discharge cycling of the cell.

* * * * *

UNITED STATES PATENT AND TRADEMARK OFFICE
CERTIFICATE OF CORRECTION

PATENT NO.  : 5,019,466
DATED       : May 28, 1991
INVENTOR(S) : Coetzer et al

It is certified that error appears in the above-identified patent and that said Letters Patent is hereby corrected as shown below:

Col. 3, line 10, please delete "10-5%" and substitute therefor --10-15%--.

Title Page:
In the References Cited, item [56]:

Please add the following:

U.S. Patent Documents

| | | | |
|---|---|---|---|
| 4,529,676 | 7/1985 | Galloway et al. | 429/103 |
| 4,546,055 | 10/1985 | Coetzer et al. | 429/103 |
| 4,560,627 | 12/1985 | Bones et al. | 429/103 |
| 4,592,969 | 6/1986 | Coetzer et al. | 429/50 |
| 4,626,483 | 12/1986 | Bones et al. | 429/50 |
| 4,722,875 | 2/1988 | Wright | 429/103 |
| 4,011,374 | 3/1977 | Kaun | 429/220 |
| 4,945,012 | 7/1990 | Bugga et al. | 429/103 |

Signed and Sealed this

Twenty-fifth Day of May, 1993

Attest:

MICHAEL K. KIRK

Attesting Officer

Acting Commissioner of Patents and Trademarks